(12) United States Patent
Heilman et al.

(10) Patent No.: US 9,127,666 B2
(45) Date of Patent: Sep. 8, 2015

(54) PUMP MOTOR CONTROL ASSEMBLY

(71) Applicant: Nidec Motor Corporation, St. Louis, MO (US)

(72) Inventors: Raymond D. Heilman, Florissant, MO (US); James P. Meagher, Indianapolis, IN (US); Jeffrey S. Sherman, Creve Coeur, MO (US); James L. Skinner, Collinsville, IL (US); John G. Schrader, St. Louis, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

(21) Appl. No.: 14/011,442

(22) Filed: Aug. 27, 2013

(65) Prior Publication Data
US 2013/0343905 A1 Dec. 26, 2013

Related U.S. Application Data

(63) Continuation of application No. 12/938,720, filed on Nov. 3, 2010, now Pat. No. 8,546,984.

(51) Int. Cl.
| | |
|---|---|
| H02K 5/10 | (2006.01) |
| F04B 53/00 | (2006.01) |
| F04B 49/00 | (2006.01) |
| H02K 5/04 | (2006.01) |
| H02B 1/26 | (2006.01) |
| F04B 49/06 | (2006.01) |
| H02K 5/22 | (2006.01) |
| H02K 11/00 | (2006.01) |

(52) U.S. Cl.
CPC ............ *F04B 49/065* (2013.01); *H02K 5/10* (2013.01); *H02K 5/225* (2013.01); *H02K 11/0073* (2013.01)

(58) Field of Classification Search
USPC .......... 310/68 R, 89; 349/58; 417/63, 423.14; 361/658, 679.01; 174/50.5
See application file for complete search history.

(56) References Cited

U.S. PATENT DOCUMENTS

| | | | | |
|---|---|---|---|---|
| 6,798,467 | B2* | 9/2004 | Tasaki et al. | 349/58 |
| 7,973,439 | B2* | 7/2011 | Watanabe et al. | 310/71 |
| 8,043,070 | B2* | 10/2011 | Stiles et al. | 417/44.1 |
| 2009/0096301 | A1* | 4/2009 | Sumi et al. | 310/89 |

* cited by examiner

*Primary Examiner* — Burton Mullins
(74) *Attorney, Agent, or Firm* — Hovey Williams LLP

(57) ABSTRACT

A pump motor assembly operable to provide driving power to a fluid pump includes a rotor, a stator, a case housing the rotor and the stator, and a control assembly mounted to the case and operable to control motor operation. The control assembly includes an information display and a cover overlying the display, with a window section in general alignment with the display. The control assembly also includes a filler plate underlying the window section to prevent any air gap along an underside thereof, allowing the display to be visible while reducing the risk of condensation buildup. The control assembly further includes a low voltage housing with the display disposed in a first compartment defined thereby, and a high voltage housing with a high voltage component disposed in a second compartment defined thereby. The low voltage housing includes a thermal and fluid barrier that substantially fluidly separates the first and second compartments to reduce the risk of liquid electrical conduction therebetween and to reduce heat transfer into the low voltage housing.

7 Claims, 7 Drawing Sheets ence herein.# PUMP MOTOR CONTROL ASSEMBLY

RELATED APPLICATION

This is a continuation of application Ser. No. 12/938,720 filed Nov. 3, 2010, which is hereby incorporated in its entirety by reference herein.

BACKGROUND OF THE INVENTION

1. Field of the Invention

The present invention relates generally to a pump motor assembly operable to provide driving power to a fluid pump. More specifically, the present invention concerns a pump motor control assembly mounted on a motor where low voltage components are housed separately from high voltage components.

2. Discussion of the Prior Art

Those of ordinary skill in the art will appreciate that fluid pumps are used in a variety of applications, with such fluid pumps often being drivingly powered by an electric motor. For example, many swimming pools use a fluid pump that is drivingly powered by a pump motor assembly to recirculate water in the pool. Traditionally, such pool pump and motor assemblies are located and used relatively close to the pool itself, frequently in an outdoor environment where the assembly may be routinely exposed to moisture and/or significant temperature changes.

As is generally known in the art, it can be desirable to conserve energy costs by running a pool pump and motor assembly for time intervals and/or at different speeds depending on the season or use of the pool. For example, it is known to drivingly power pool pumps with multiple-speed or full variable speed motors, which may be set to run for a predetermined amount of time. Such programmable options require control assemblies that include a timer to control the desired motor operation. Known control assemblies have been satisfactory in some respects, but they have also presented drawbacks.

Conventionally, pool motors themselves require generally high voltage components (such as relays, windings, and the like) for operation, while controls for such motors (such as timers) require generally low voltage components. Known pool motor assemblies that include a mixture of high and low voltage components can lead to safety concerns, particularly when the control includes an interface that requires manual manipulation by a user. Typical outdoor placement of such pool motor assemblies can heighten such concerns when the pool motor assembly is in a wet environment.

Additionally, traditional pool motor controls often include some type of display screen on which information regarding motor operation may be displayed and/or changed. When such pool motors and controls are used in humid or wet areas, as is often the case for swimming pool motor assemblies, the display may present detrimental condensation concerns. The use of such pool motors and controls in locations where ambient air temperature can drop significantly during evening hours or overnight, as is common, can heighten such condensation concerns. The combination of such environmental factors coupled with heat generated by the motor, and particularly by the high voltage components, can exacerbate condensation issues even further.

SUMMARY

The present invention provides a pump motor assembly that substantially fluidly isolates user contact areas (such as buttons, displays, or other low voltage interface components) from all high voltage motor driving components. Such fluid isolation between low voltage components and high voltage components may improve user confidence in manipulating the control, and may permit obtaining certain safety certifications. The level of safety perceived by a user due to fluid isolation between low voltage components and high voltage components may be especially enhanced for controls paired with motor assemblies that include open endshields for venting purposes. The present invention further provides a pump motor assembly that also reduces the risk of condensation buildup on an interface, particularly on a display portion, which may otherwise cause user concern.

According to one aspect of the present invention, a pump motor assembly is provided that is operable to provide driving power to a fluid pump. The pump motor assembly includes a rotor rotatable about a rotational axis, a stator spaced radially from the rotor, and a case at least substantially housing the rotor and the stator. The pump motor assembly further includes a control assembly mounted to the case and operable to control motor operation based upon at least one input. The control assembly includes a display on which information regarding motor operation is displayed and a cover disposed in a covering relationship relative to the display. The cover includes a substantially transparent window section in general alignment with the display. The control assembly further includes a substantially transparent filler plate underlying the window section in an interposed relationship between the display and the cover, with the filler plate contacting the window section so as to at least substantially eliminate any air gap along an underside of the window section, thereby permitting the display to be visible through the window section while reducing the risk of condensation buildup along the underside of the window section.

According to another aspect of the present invention, a pump motor assembly is provided that is operable to provide driving power to a fluid pump. The pump motor assembly includes a rotor rotatable about a rotational axis, a stator spaced radially from the rotor, and a case at least substantially housing the rotor and the stator. The pump motor assembly further includes a control assembly operable to control motor operation based upon at least one input. The control assembly includes a housing mounted to the case, and the housing includes an open-ended box defining a control compartment. The control assembly further includes a visual indicator located within the control compartment and operable to provide visually perceptible information regarding motor operation. The housing includes a cover sealingly coupled to the box adjacent one end thereof in a covering relationship relative to the indicator. The cover includes a substantially transparent window section in general alignment with the indicator so that the indicator is visible through the window section. The housing further includes a thermal and fluid barrier that spans the box adjacent an opposite end from the cover, with the barrier at least substantially fluidly sealing the control compartment adjacent the opposite end and reducing heat transfer to the control compartment.

Another aspect of the present invention concerns a pump motor assembly that is operable to provide driving power to a fluid pump. The pump motor assembly includes a rotor rotatable about a rotational axis, a stator spaced radially from the rotor, and a case at least substantially housing the rotor and the stator. The pump motor assembly further includes a control assembly mounted to the case and operable to control motor operation based upon at least one input. The control assembly includes at least one high voltage component comprising a power input operable to receive high voltage power, and at least one low voltage component comprising an indicator providing information regarding motor operation. The control assembly further includes a high voltage housing that defines a high voltage compartment in which the at least one high voltage component is housed, and a low voltage housing that defines a low voltage compartment in which the at least one low voltage component is housed, with the low voltage compartment being devoid of any high voltage components of the control assembly. The high and low voltage compartments are substantially fluidly separated from one another so as to reduce the risk of liquid electrical conduction between the compartments.

This summary is provided to introduce a selection of concepts in a simplified form that are further described below in the detailed description of the preferred embodiments. This summary is not intended to identify key features or essential features of the claimed subject matter, nor is it intended to be used to limit the scope of the claimed subject matter.

Various other aspects and advantages of the present invention will be apparent from the following detailed description of the preferred embodiments and the accompanying drawing figures.

BRIEF DESCRIPTION OF THE DRAWING FIGURES

A preferred embodiment of the present invention is described in detail below with reference to the attached drawing figures, wherein.

Figure 2:
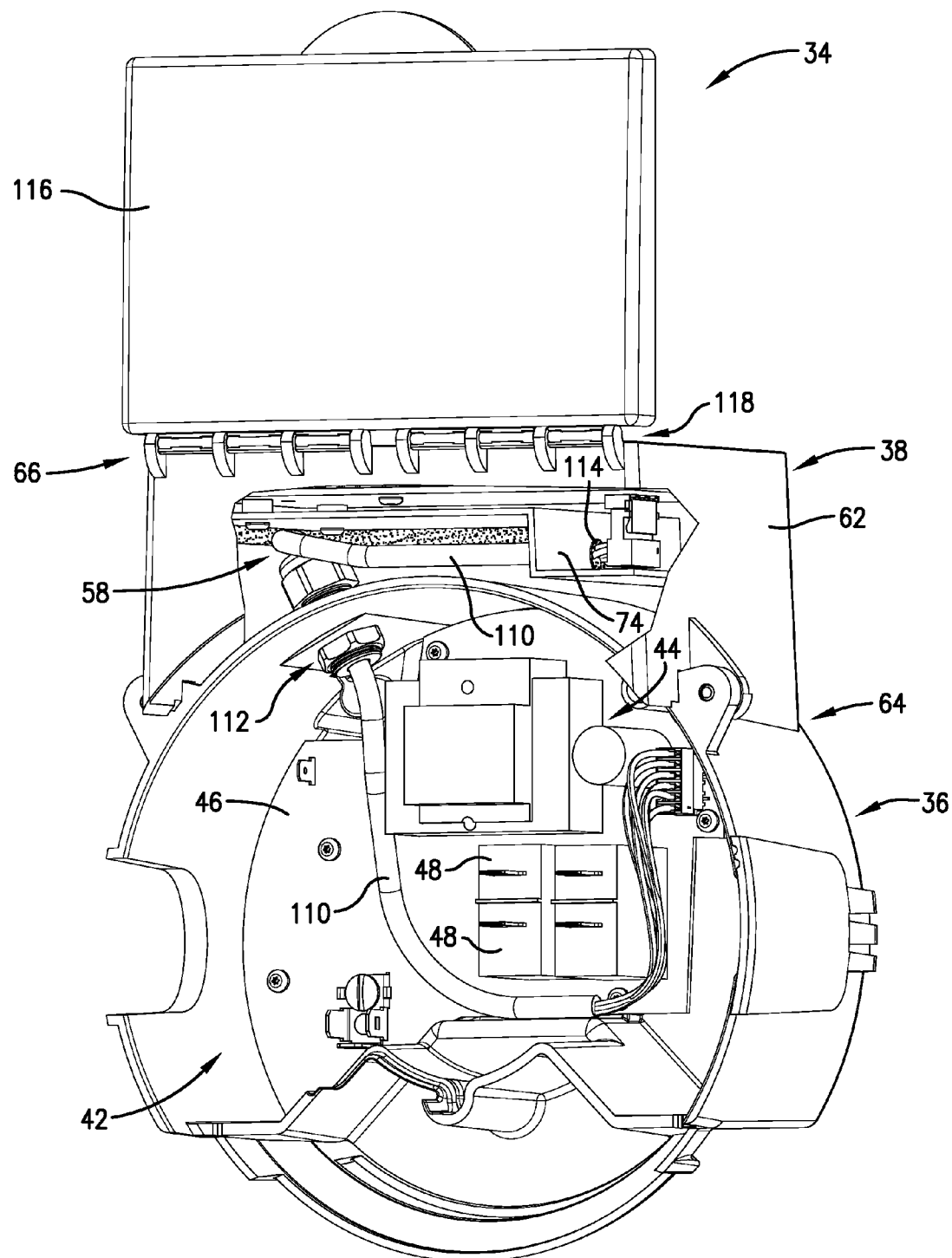
FIG. 2 is a partial cutaway, isometric view of a portion of the pump motor assembly of FIG. 1, particularly depicting the control assembly including a high voltage housing, a low voltage housing, and associated components disposed within the housings, with the low voltage housing being disposed above, secured to, and fluidly separated from the high voltage housing.
Figure 3:
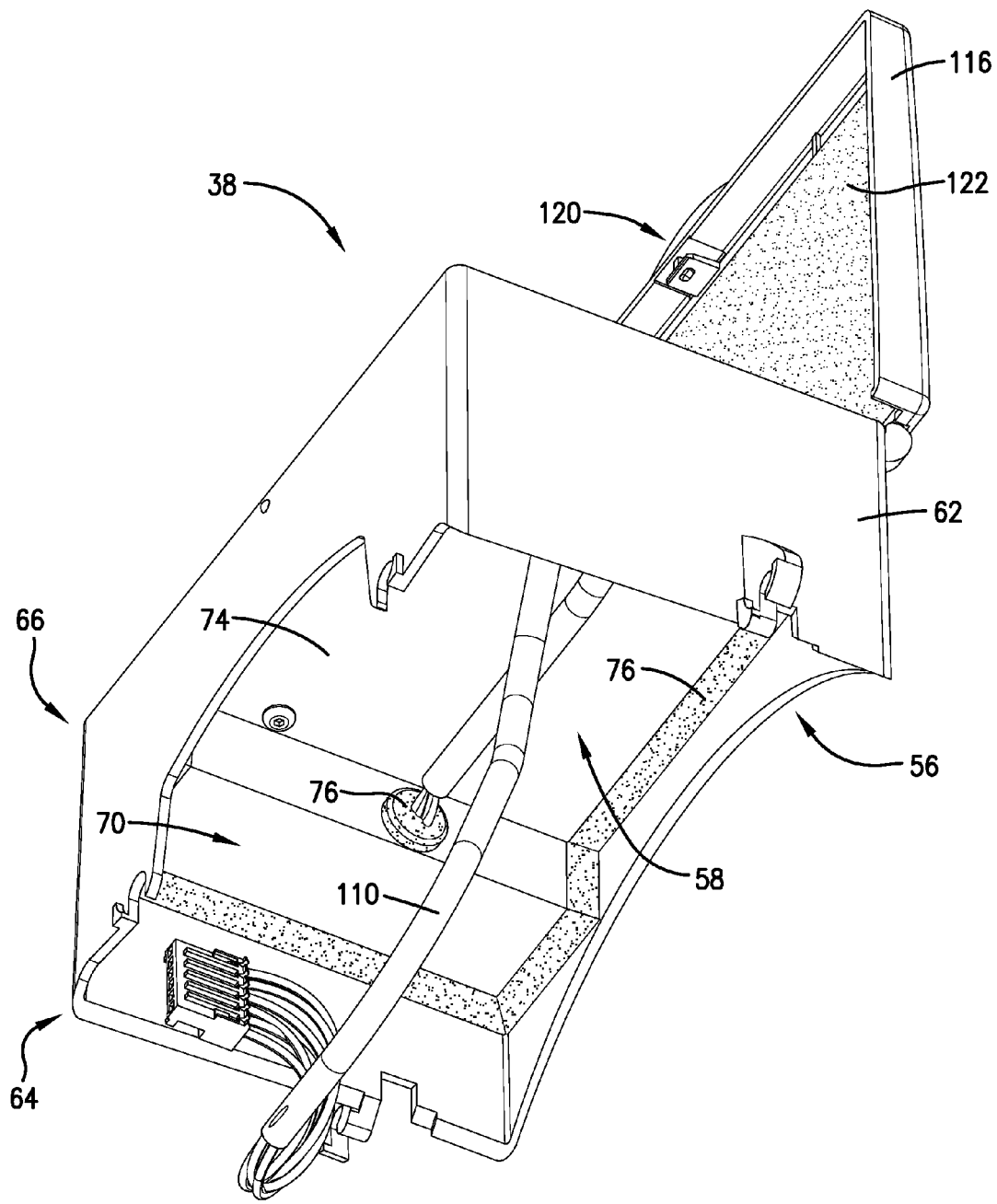
Figure 4:
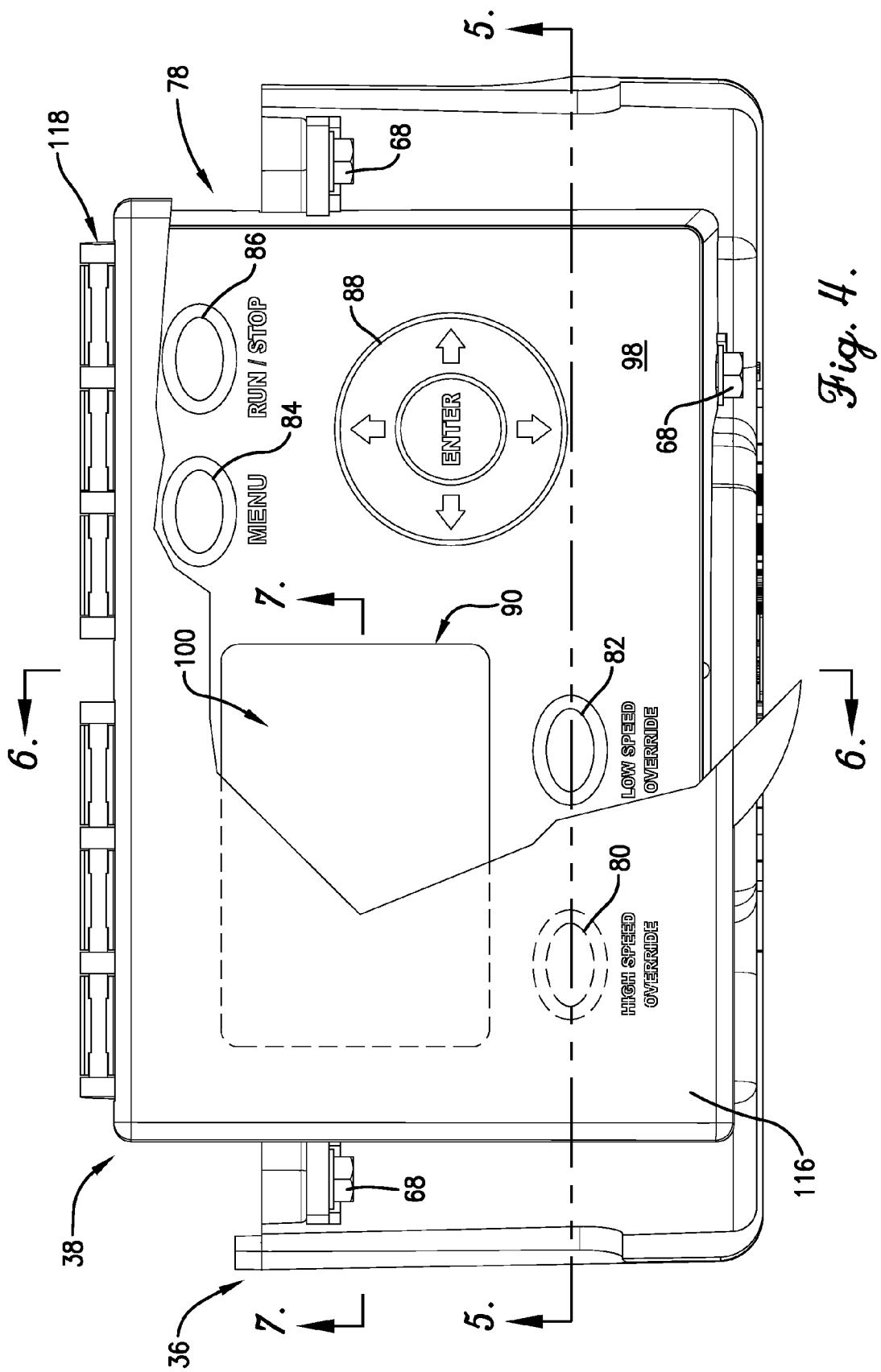
Figure 5:
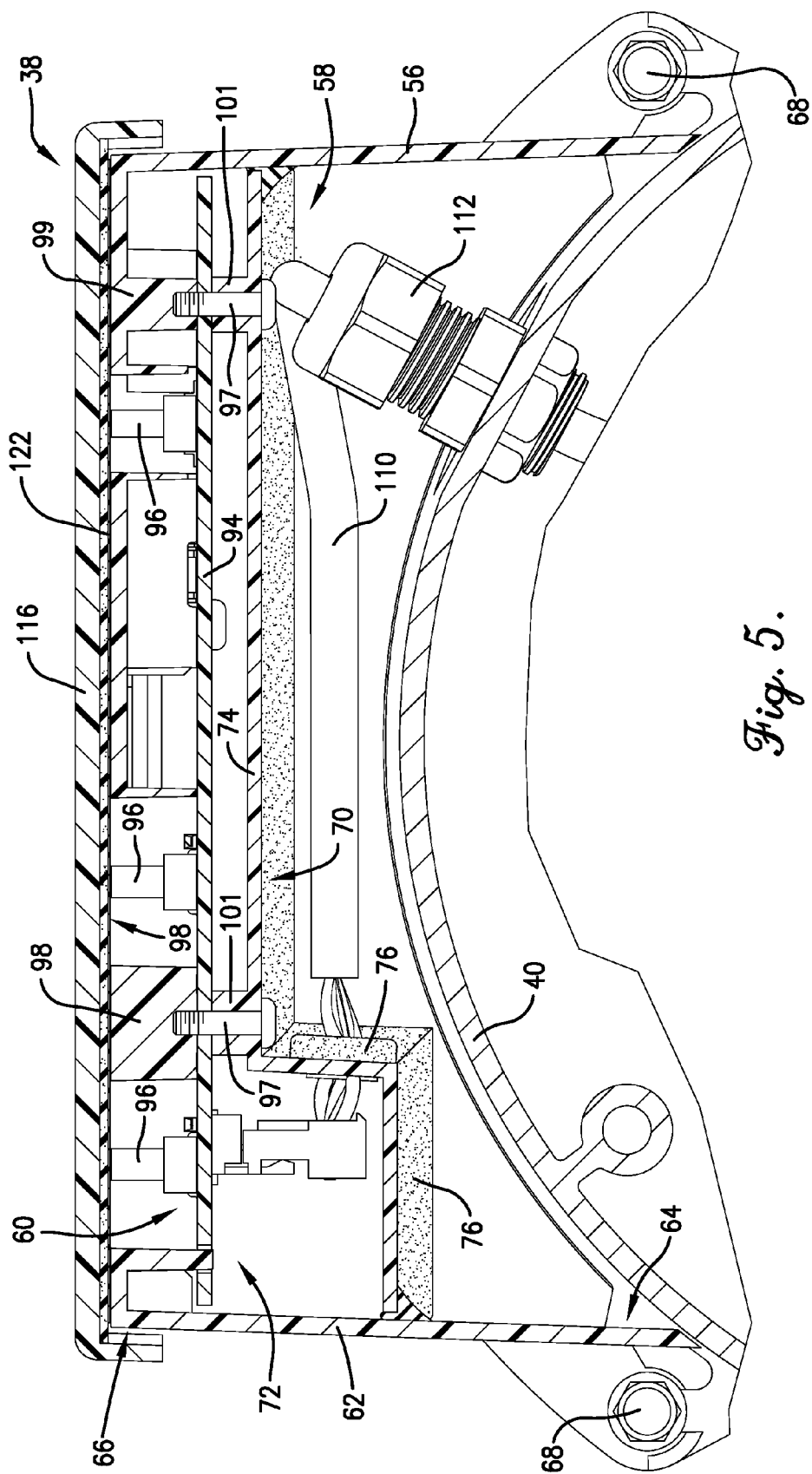
Figure 6:
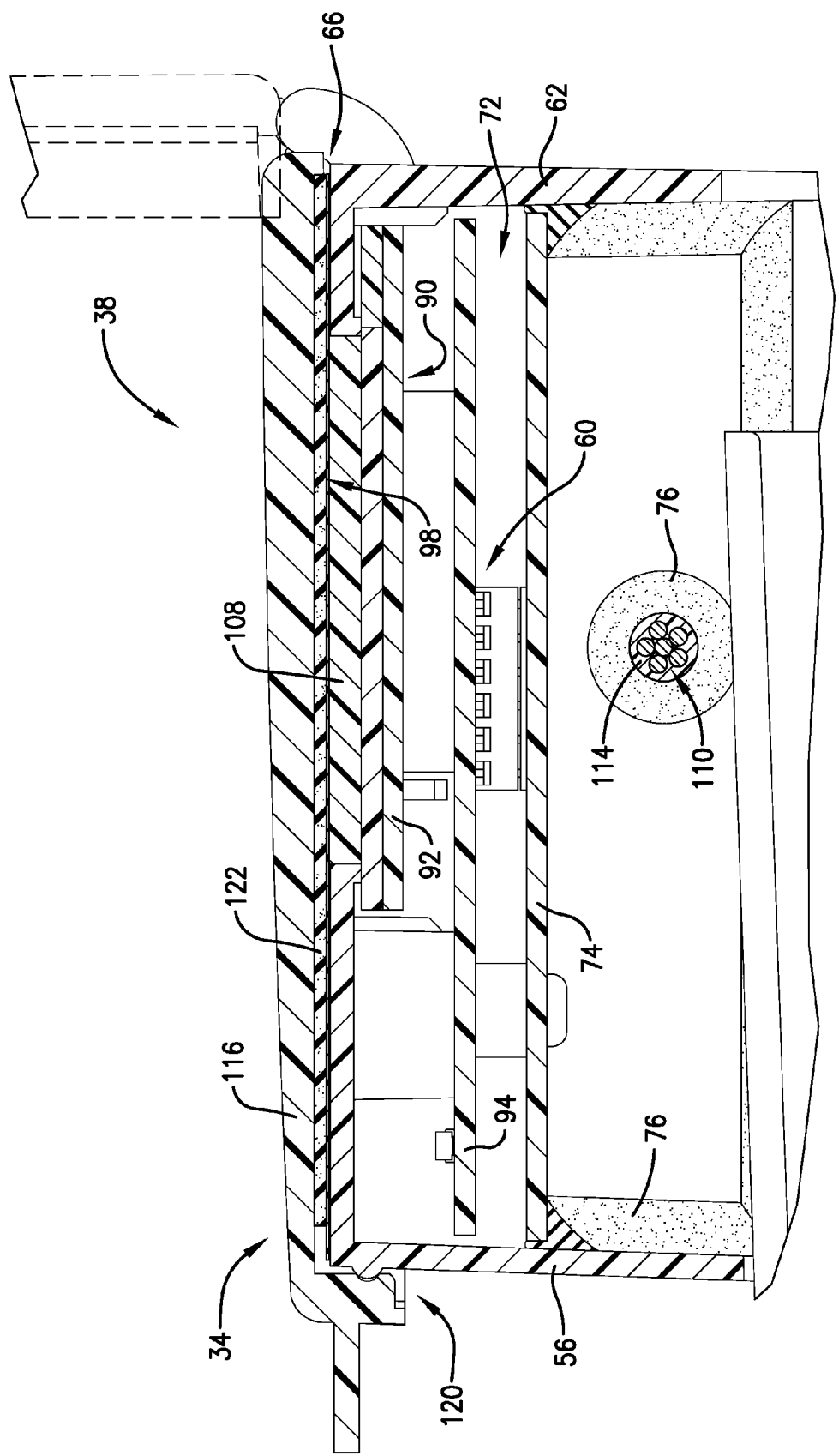
Figure 7:
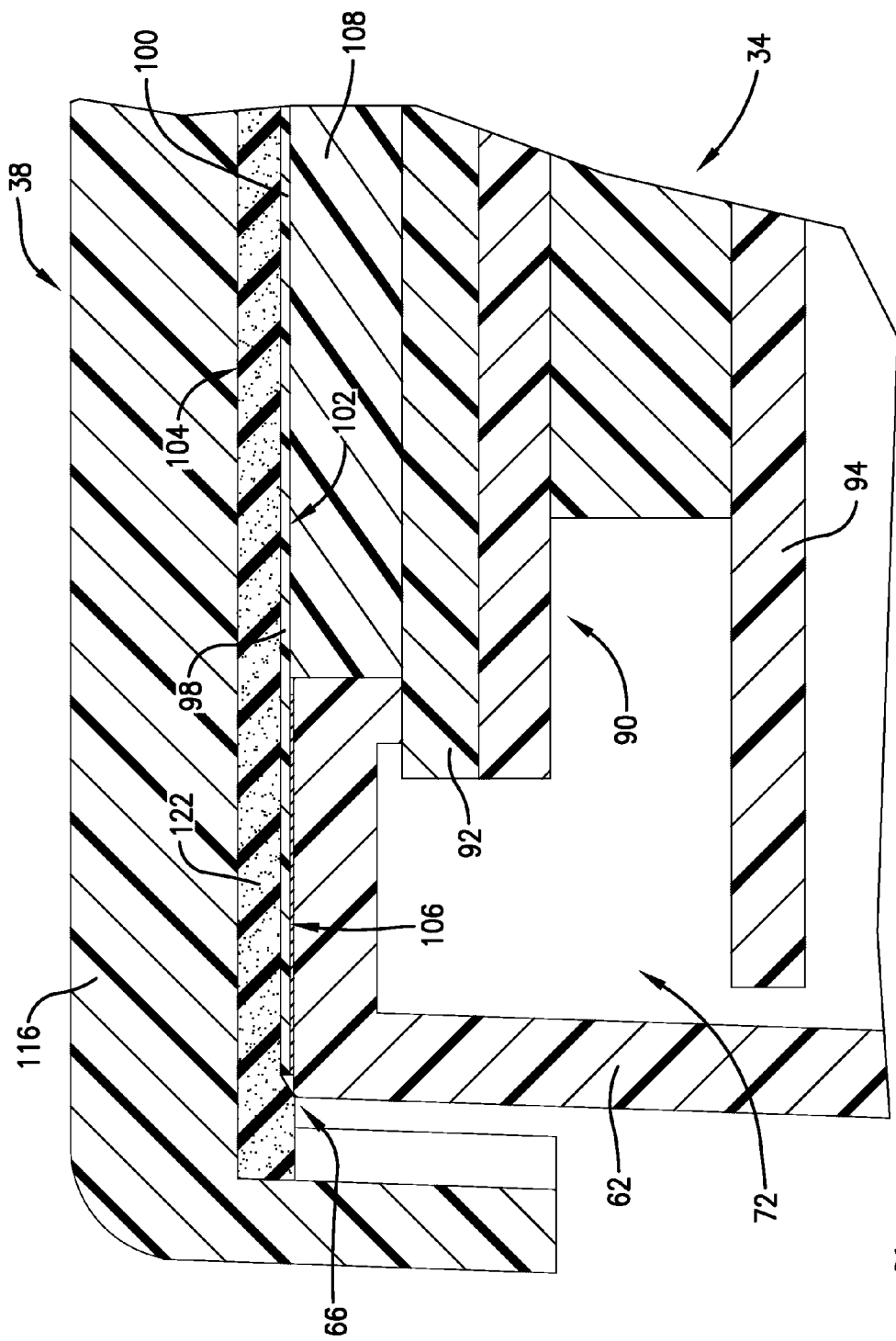

FIG. 3 is an isometric view of a portion of the control assembly of FIG. 2, shown from a vantage point generally opposite that of FIG. 2, depicting in detail the low voltage housing including an open-ended box and a protective lid therefor illustrated in an open position, with the low voltage housing including a thermal and fluid barrier spanning the box, and with low voltage components disposed therein;

FIG. 4 is a partial cutaway, top-down plan view of the control assembly of FIG. 2, illustrated with the protective lid in a closed position, depicting in detail a user interface including a display assembly and button indicia printed on a membrane cover that seals a top margin of the box;

FIG. 5 is a fragmentary, partial side sectional view of a portion of the control assembly of FIG. 2, taken along the line 5-5 of FIG. 4, depicting in detail low voltage components, including push button switches, disposed within the low voltage housing and being substantially fluidly sealed between the membrane cover and the thermal and fluid barrier;

FIG. 6 is a fragmentary, partial side sectional view of a portion of the control assembly of FIG. 2, taken along the line 6-6 of FIG. 4, depicting in detail low voltage components, including a liquid crystal display, disposed within the low voltage housing and being substantially fluidly sealed between the membrane cover and the thermal and fluid barrier, with a filler plate being interposed between the display and the membrane cover; and FIG. 7 is an enlarged, fragmentary, partial side sectional view of a portion of the control assembly of FIG. 2, taken along the line 7-7 of FIG. 4, depicting in detail the membrane cover being secured to the top margin of the box, the filler plate being interposed between the display and the membrane cover, and an upper insulating pad within the protective lid being disposed against the membrane cover.

The drawing figures do not limit the present invention to the specific embodiments disclosed and described herein. The drawings are not necessarily to scale, emphasis instead being placed upon clearly illustrating the principles of the preferred embodiments.

DETAILED DESCRIPTION OF THE PREFERRED EMBODIMENTS

The present invention is susceptible of embodiment in many different forms. While the drawings illustrate, and the specification describes, certain preferred embodiments of the invention, it is to be understood that such disclosure is by way of example only. There is no intent to limit the principles of the present invention to the particular disclosed embodiments.

Figure 1:
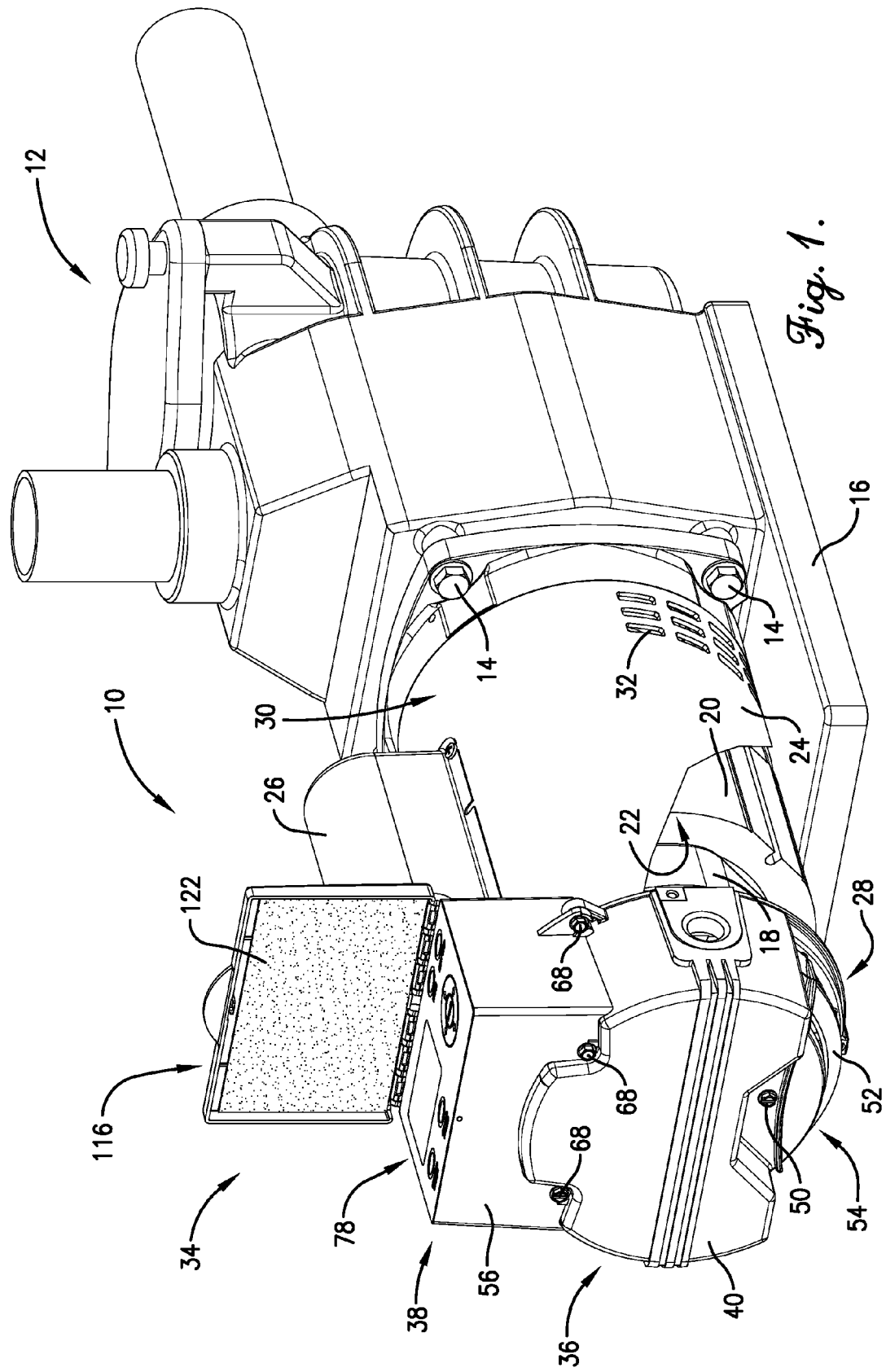
FIG. 1 is a partial cutaway, isometric view of a pump motor assembly constructed in accordance with the principles of a preferred embodiment of the present invention, with the pump motor assembly including a control assembly, and with the pump motor assembly being connected to a fluid pump to provide driving power thereto.

With initial reference to FIG. 1, a pump motor assembly 10 constructed in accordance with the principles of an embodiment of the present invention is depicted for use in various applications. The illustrated pump motor assembly 10 is connected to a fluid pump 12 and is configured to provide driving power thereto, as will be readily understood by one of ordinary skill in the art. The pump motor assembly 10 is secured to the fluid pump 12 with fasteners in the form of bolts 14, although various connecting structures (not shown) may be alternatively used without departing from the teachings of the present invention.

While the pump motor assembly 10 is useful in various applications, the illustrated embodiment has particular utility when the pump motor assembly 10 is configured to provide driving power to a fluid pump, such as the fluid pump 12, and is used as a swimming pool motor. In this regard, the pump motor assembly 10 and the fluid pump 12 are supported on a common base structure 16, which may be disposed in close proximity to a swimming pool and is commonly installed in an outdoor environment where the pump motor assembly 10 may be routinely exposed to moisture and/or significant temperature changes, as will be readily appreciated by one of ordinary skill in the art. The structure and operation of the fluid pump 12 may be generally conventional in nature and need not be described in further detail here.

With attention still to FIG. 1, the pump motor assembly 10 broadly includes a rotor 18 rotatable about a rotational axis, and a stator 20 spaced radially from the rotor 18. The rotor 18 and the stator 20 are both contained within an internal motor chamber 22 defined by a motor case 24, such that the motor case 24 at least substantially houses the rotor 18 and the stator 20. A shaft (not shown) projects axially outwardly from the pump motor assembly 10 to suitably provide driving power to the fluid pump 12, as will be readily understood by one of ordinary skill in the art upon review of this disclosure.

As is somewhat conventional, the pump motor assembly 10 includes a capacitor (not shown) that is housed underneath a capacitor cover 26 secured to a portion of the motor case 24 in a generally traditional manner. As is also somewhat conventional, the pump motor assembly 10 may additionally include a fan (not shown) that turns with the shaft to pull cooling vent air through the chamber 22 of the pump motor assembly 10, as will be readily appreciated by one of ordinary skill in the art. In more detail, it is known that electric motors often generate a significant amount of heat that must be dissipated.

Such heat generated by the pump motor assembly 10 may be dissipated with a cooling system (not shown) that may include the fan. An example of such a cooling system that may be suitable for use with the illustrated pump motor assembly 10 is disclosed in U.S. patent application Ser. No. 12/124,922 ("the '922 application"). The '922 application is titled Cooling System for a Motor and Associated Electronics, and is hereby incorporated by reference in its entirety, to the extent not inconsistent with the present disclosure.

The motor case 24 is generally cylindrical and presents an intake side axial margin 28 and an exhaust side axial margin 30. The motor case 24 includes a plurality of exhaust vent openings 32 disposed along a lower margin of the case 24 generally adjacent the exhaust side axial margin 30. As is generally conventional in the art, the motor case 24 may further include an endshield (not shown) adjacent the intake side axial margin 28.

With continued reference to FIG. 1, the pump motor assembly 10 also broadly includes a control assembly 34 mounted to the motor case 24 and operable to control motor operation based upon at least one input. The control assembly 34 is configured to control speeds and run times (which may be integrated into programs) of the pump motor assembly, as will be generally understood by one of ordinary skill in the art. While the illustrated pump motor assembly 10 is depicted as including two speeds, the pump motor assembly 10 could alternatively include additional discrete speeds or be configured as a full variable speed motor without departing from the teachings of the present invention. The control assembly 34 generally includes a high voltage assembly 36 and a low voltage assembly 38.

Turning now to FIGS. 1 and 2, the high voltage assembly 36 broadly includes a high voltage housing 40 that defines a high voltage compartment 42. The high voltage assembly 36 also includes high voltage components 44 comprising power inputs operable to receive high voltage power. The high voltage components 44 are disposed within the high voltage compartment 42 so as to be housed within the high voltage housing 40. In more detail, the depicted high voltage components 44 include a high voltage printed circuit board ("PCB") assembly 46 and a plurality of relays 48 that are operably connectable to the stator 20, as will be readily appreciated by one of ordinary skill in the art.

The high voltage components 44 generate a significant amount of heat that must be dissipated, as will be generally understood by one of ordinary skill in the art. In the illustrated embodiment, the high voltage components 44 are disposed generally adjacent (more specifically, generally below) the low voltage assembly 38. Such placement of the high voltage components 44 would ordinarily heat up air disposed within the low voltage assembly 38, as discussed in more detail below.

With brief reference back to FIG. 1, the high voltage housing 40 is mounted to the motor case 24 with at least one fastener in the form of a screw 50. In more detail, the high voltage housing 40 comprises a vented endshield cover including a fluid deflecting baffle 52 that defines a vent passage 54 therethrough, which permits vent air to communicate with the chamber 22 of the pump motor assembly 10. An example of such a vented endshield cover that may be suitable for use with the illustrated pump motor assembly 10 is disclosed in U.S. patent application Ser. No. 12/266,390 ("the '390 application"). The '390 application is titled Liquid Deflecting Baffle for an Electric Motor, and is hereby incorporated by reference in its entirety, to the extent not inconsistent with the present disclosure.

With continued reference to FIG. 2, and turning also to FIGS. 3-6, the low voltage assembly 38 broadly includes a low voltage housing 56 that defines a low voltage compartment 58. The low voltage assembly 38 also includes low voltage components 60 described in detail below. The low voltage components 60 are disposed within the low voltage compartment 58 so as to be housed within the low voltage housing 56.

In more detail, the illustrated low voltage housing 56 takes the form of an open-ended box 62 that presents a bottom margin 64 and an opposite top margin 66. As shown particularly in FIG. 2, the low voltage housing 56 is secured to the high voltage housing 40 along the bottom margin 64. The housings 56, 40 are secured to one another with fasteners in the form of screws 68.

As shown in FIGS. 3 and 5, the low voltage housing 56 includes a thermal and fluid barrier 70 that generally spans the open-ended box 62 at least partially adjacent the bottom margin 64 thereof. The thermal and fluid barrier 70 at least substantially fluidly seals a portion of the low voltage compartment 58 to define a control compartment 72 thereabove. The thermal and fluid barrier 70 reduces heat transfer into the substantially sealed control compartment 72, particularly from the high voltage components 44 disposed within the high voltage assembly 36. Furthermore, since the high voltage compartment 42 and the control compartment 72 portion of the low voltage compartment 58 are substantially fluidly separated from one another, the risk of liquid electrical conduction between the compartments 42, 72 is greatly reduced, if not eliminated.

In the illustrated embodiment, the thermal and fluid barrier 70 includes a barrier plate 74 that extends across the open-ended box 62. The illustrated barrier plate 74 is formed of a thermoplastic material, although other suitable insulating materials may be alternatively used without departing from the teachings of the present invention. In even more detail, the illustrated barrier plate 74 presents a thickness dimension, as measured along a direction extending generally transversely relative to the margins 64, 66 of the open-ended box 62, with the thickness dimension being about 0.060 of an inch, although other thickness dimensions are certainly within the ambit of the present invention.

Also in the illustrated embodiment, the thermal and fluid barrier 70 further includes a sealant 76 that is provided along the junction defined between the barrier plate 74 and walls of the open-ended box 62. The illustrated sealant 76 comprises a room temperature vulcanizing ("RTV") material, such as vulcanized rubber, although other suitable materials may be alternatively used without departing from the teachings of the present invention.

With attention now specifically to FIG. 4, the control assembly 34 includes a user interface 78 that facilitates control of the motor, as will be readily appreciated by one of ordinary skill in the art upon review of this disclosure. The user interface 78 comprises at least one manually operable switch, depicted in the form of override buttons 80, 82. The illustrated user interface 78 further comprises additional manually operable switches, depicted in the form of a menu button 84, a run/stop button 86, and a five-way directional and selecting controller 88.

As will be readily appreciated by one of ordinary skill in the art, an end user may utilize the user interface 78 to program or otherwise control the motor operation. For example, an end user may utilize the buttons 84, 86 and the directional and selecting controller 88 to set a timer control for the motor to run at a high speed for a certain duration, to run a low speed for a certain duration, or to turn off. Numerous motor operating conditions may be programmed, manually started, or even overridden, depending on performance requirements for the pump motor assembly 10. In this way, the user interface 78 of the control assembly 34 provides user-selected control of the pump motor assembly 10, and thereby of the pump 12, at the motor.

The depicted user interface 78 further comprises a visually perceptible indicator in the form of a display 90, on which information regarding motor operation is displayed. Although the illustrated embodiment includes the display 90, an alternative indicator could take other forms, such as visual indicators comprising lamps and/or light emitting diodes ("LEDs") or non-visual indicators comprising audio or other sensory indications, while remaining within the ambit of the present invention. In more detail, the depicted display 90 includes a liquid crystal display ("LCD") 92, as will be readily appreciated by one of ordinary skill in the art upon review of this disclosure and the accompanying drawings.

It is noted that while the illustrated user interface 78 includes a plurality of manually operable switches 80, 82, 84, 86, 88 as part of the control assembly 34, an alternative user interface may be similarly controlled through the sending and receiving of wireless signals through transceivers (not shown), such as with a remote control. Thus, it is within the ambit of the present invention for an end user to utilize an alternative user interface (not shown) without manually pressing on switches, although it is also noted that such an alternative user interface may still include the display 90 in order to display information regarding motor operation.

With particular reference to FIG. 5, the illustrated low voltage components 60 further comprise a computing device in the form of a low voltage printed circuit board ("PCB") assembly 94. The low voltage PCB assembly 94 is coupled with the display 90 for electrical communication therewith. In addition, the buttons 80, 82, 84, 86, and the controller 88 each comprise one or more manually depressible buttons 96, with the low voltage PCB assembly 94 also being coupled thereto for electrical communication therewith.

In addition, the low voltage PCB assembly 94 is positioned within the control compartment 72 and secured to the open-ended box 62 with a plurality of fasteners in the form of screws 97 received in spacers 99 that extend from the top margin 66 of the open-ended box 62. Moreover, the barrier plate 74 is also positioned within the control compartment 72 and secured to the low voltage PCB assembly 94 (and thereby secured to the open-ended box 62) with the same screws 97 passing through standoffs 101 formed in the barrier plate 74.

Looking now to FIGS. 4-7, the low voltage housing 56 of the control assembly 34 includes a cover in the form of a flexible membrane 98 that generally spans the open-ended box 62 adjacent the top margin 66 thereof. The flexible membrane 98 at least substantially fluidly seals a portion of the low voltage compartment 58 to define the control compartment 72 therebelow. The flexible membrane 98 prevents fluids or other potentially contaminating or otherwise undesirable materials from entering the control compartment 72.

In the illustrated embodiment, the flexible membrane 98 is disposed in a covering relationship relative to the low voltage components 60, including the display 90. The flexible membrane 98 includes a substantially transparent window section 100 that is disposed in general alignment with the display 90 (general vertical alignment in the depicted embodiment), such that the display 90 can be viewed through the window section 100 of the flexible membrane 98. As will be readily appreciated by one of ordinary skill in the art upon review of this disclosure, the flexible membrane 98 also permits operation of the manually depressible buttons 96 from outside of the cover.

With particular reference to the enlarged view of FIG. 7, the flexible membrane 98 presents an underside 102 and an opposite upper side 104. The flexible membrane 98 is secured to the top margin 66 of the open-ended box 62 with an adhesive layer 106 disposed around a generally lateral periphery of the underside 102 of the flexible membrane 98. As can be seen particularly in FIGS. 1 and 4, the upper side 104 of the flexible membrane 98 includes printed indicia thereon (such as identifying names of the buttons 80, 82, 84, 86, and the controller 88) that cooperatively forms part of the user interface 78 described in detail above.

The illustrated flexible membrane 98 is formed of a polyester material, although other suitable materials may be alternatively used without departing from the teachings of the present invention. In even more detail, the illustrated flexible membrane 98 presents a thickness dimension, as defined between the underside 102 and the upper side 104 thereof, with the thickness dimension being about 0.008 of an inch, although other thickness dimensions are certainly within the ambit of the present invention.

Turning now to FIGS. 6 and 7, the control assembly 34 further includes a substantially transparent filler plate 108 that underlies the window section 100 of the flexible membrane 98 in a generally interposed relationship between the display 90 and the underside 102 of the flexible membrane 98. The filler plate 108 contacts at least the underside 102 of the flexible membrane 98, including the window section 100 thereof, so as to at least substantially eliminate any air gap (not shown) along the underside 102 of the flexible membrane 98, where condensation may otherwise form. In this way, the display 90 remains visible through the window section 100 of the flexible membrane 98 and the risk of condensation buildup along the underside 102 of the flexible membrane 98, including the window section 100 thereof, is greatly reduced, if not eliminated.

In the illustrated embodiment, the filler plate 108 also contacts the display 90 so as to be sandwiched between the underside 102 of the flexible membrane 98, including the window section 100 thereof, and the display 90. In this way, the filler plate 108 also at least substantially eliminates any air gap (not shown) along the display 90, where condensation may otherwise form. The illustrated filler plate 108 comprises a thermoplastic material, although other suitable materials may be alternatively used without departing from the teachings of the present invention. In even more detail, the illustrated filler plate 108 is formed of polycarbonate and presents a thickness dimension, as measured between the display 90 and the underside 102 of the flexible membrane 98, with the thickness dimension being at least about 0.125 of an inch, although other thickness dimensions are certainly within the ambit of the present invention.

As will be readily appreciated by one of ordinary skill in the art upon review of this disclosure, there is to be some electrical signal communication between the high voltage components 44 of the high voltage assembly 36 and the low voltage components 60 of the low voltage assembly 38 in order for the control assembly 34 to properly function. As shown particularly in FIGS. 3, 5, and 6, the high voltage assembly 36 and the low voltage assembly 38 are linked with low voltage cable in the form of jacketed wires 110. It is noted initially that while the illustrated link includes wiring 110, an alternative electrical communication network may similarly transmit information through the sending and receiving of wireless signals through transceivers (not shown). Thus, it is within the ambit of the present invention for the high voltage assembly 36 and the low voltage assembly 38 to wirelessly communicate electrical signals therebetween.

The illustrated wiring 110 interconnects the high voltage components 44 (in particular the high voltage PCB 46) and the low voltage components 60 (in particular the low voltage PCB 94) in a manner generally known in the art such that the control assembly 34 is configured to control motor operations. The wiring 110 extends from within the high voltage compartment 42 and into the low voltage compartment 58 through a cord grip assembly 112, which provides strain relief as well as a fluid-tight seal around the wiring 110. The wiring 110 also extends through the barrier plate 74 of the thermal and fluid barrier 70 and into the sealed control compartment 72. The barrier plate 74 defines a wire-receiving opening 114 therein, with the wiring 110 extending therethrough and sealant 76 being provided within the opening 114 around the wiring 110 to substantially fluidly seal the control compartment 72 as described in detail above.

Finally, with reference to FIGS. 4-7, the low voltage housing 56 includes a protective lid 116 that is shiftable into and out of a closed position, in which the protective lid 116 is substantially superimposed over the flexible membrane 98. As will be readily understood, the protective lid 116 is shown in the closed position in FIGS. 4-7, and is shown in an open position in FIGS. 1-3 and in phantom lines in FIG. 6. The protective lid 116 is coupled to the top margin 66 of the open-ended box 62 with a hinge connection 118 such that the protective lid 116 is generally swingably moveable into and out of the closed position. Additionally, as depicted particularly in FIG. 6, the protective lid 116 is securable in the closed position with a latch assembly 120.

The protective lid 116 includes an insulating pad 122 that overlies the flexible membrane 98 when the protective lid 116 is in the closed position. As can be seen in FIGS. 5-7, the insulating pad 122 contacts the upper side 104 of the flexible membrane 98, so as to at least substantially eliminate any air gap (not shown) along the upper side 104 of the flexible membrane 98 when the protective lid 116 is in the closed position. In this way, the insulating pad 122 reduces any temperature differential between the flexible membrane 98 and air contained within the control compartment 72, where a large temperature differential may otherwise form. The illustrated insulating pad 122 is formed of a foam rubber material, although other suitable materials may be alternatively used without departing from the teachings of the present invention.

Such a temperature differential may otherwise form particularly if the pump motor assembly 10 is disposed outdoors in a location where ambient air temperatures may be significantly lower than air temperatures within the high voltage compartment 42, where the air may be heated by the operation of the high voltage components 44. Thus, by insulating the flexible membrane 98 against such a temperature differential when the protective lid 116 is closed, the risk of condensation buildup along either the underside 102 or the upper side 104 of the flexible membrane 98, including the window section 100 thereof, is greatly reduced, if not eliminated.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventors hereby state their intent to rely on the Doctrine of Equivalents to determine and access the reasonably fair scope of the present invention as pertains to any apparatus not materially departing from but outside the literal scope of the invention set forth in the following claims.

What is claimed is:

1. A pump motor assembly operable to provide driving power to a fluid pump, said pump motor assembly comprising:
   a rotor rotatable about a rotational axis;
   a stator spaced radially from the rotor;
   a case at least substantially housing the rotor and the stator; and
   a control assembly mounted to the case and operable to control motor operation based upon at least one input,
   said control assembly including a display on which information regarding motor operation is displayed,
   said control assembly including a cover disposed in a covering relationship relative to the display,
   said cover including a substantially transparent window section in general alignment with the display,
   said control assembly including a substantially transparent filler plate underlying the window section in an interposed relationship between the display and the cover, with the filler plate contacting the window section so as to at least substantially eliminate any air gap along an underside of the window section, thereby permitting the display to be visible through the window section while reducing the risk of condensation buildup along the underside of the window section,
   said at least one input including a manually operable switch,
   said switch and said display cooperatively presenting a user interface of the control assembly so as to provide user-selected control of the motor, and thereby the pump, at the motor,
   said switch comprising a manually depressible button underlying the cover,
   said cover comprising a flexible membrane so as to permit button operation from outside the cover,
   said control assembly including a protective lid shiftable into and out of a closed position, in which the lid is substantially superimposed over the cover.

2. The pump motor assembly as claimed in claim 1,
   said filler plate contacting the display so as to be sandwiched between the window section and the display, with the filler plate at least substantially eliminating any air gap along the display.

3. The pump motor assembly as claimed in claim 2,
   said filler plate comprising a thermoplastic.

4. The pump motor assembly as claimed in claim 3,
   said filler plate presenting a thickness measured between the display and the underside of the window section,
   said plate thickness being at least about 0.125 of an inch.

5. The pump motor assembly as claimed in claim 1,
   said flexible membrane being formed of polyester.

6. The pump motor assembly as claimed in claim 1,
   said display comprising a liquid crystal display.

7. A pump motor assembly operable to provide driving power to a fluid pump, said pump motor assembly comprising:
   a rotor rotatable about a rotational axis;
   a stator spaced radially from the rotor;
   a case at least substantially housing the rotor and the stator; and
   a control assembly mounted to the case and operable to control motor operation based upon at least one input,
   said control assembly including a display on which information regarding motor operation is displayed, said control assembly including a cover disposed in a covering relationship relative to the display, said cover including a substantially transparent window section in general alignment with the display, said control assembly including a substantially transparent filler plate underlying the window section in an interposed relationship between the display and the cover, with the filler plate contacting the window section so as to at least substantially eliminate any air gap along an underside of the window section, thereby permitting the display to be visible through the window section while reducing the risk of condensation buildup along the underside of the window section, said control assembly including a protective lid shiftable into and out of a closed position, in which the lid is substantially superimposed over the cover, said lid including an insulating pad that overlies the cover when the lid is in the closed position, such that the insulating pad reduces any temperature differential between the cover and air contained within the control assembly so as to reduce the risk of condensation buildup along an underside of the cover, said control assembly including an open-ended box defining a control compartment, with the cover being sealingly coupled to the box adjacent one end thereof, said control assembly including a thermal and fluid barrier that spans the box adjacent an opposite end from the cover, with the barrier at least substantially fluidly sealing the control compartment adjacent the opposite end and reducing heat transfer to the control compartment.

* * * * *